United States Patent
Suiter

(10) Patent No.: US 10,296,693 B2
(45) Date of Patent: May 21, 2019

(54) THREE-DIMENSIONAL COMPOSITE SOLID COMPONENT MODELING

(71) Applicant: Mentor Graphics Corporation, Wilsonville, OR (US)

(72) Inventor: Gerald Suiter, Madison, AL (US)

(73) Assignee: Mentor Graphics Corporation, Wilsonville, OR (US)

(*) Notice: Subject to any disclaimer, the term of this patent is extended or adjusted under 35 U.S.C. 154(b) by 0 days.

(21) Appl. No.: 14/608,626

(22) Filed: Jan. 29, 2015

(65) Prior Publication Data
US 2016/0171144 A1 Jun. 16, 2016

Related U.S. Application Data

(63) Continuation-in-part of application No. 14/567,488, filed on Dec. 11, 2014, now Pat. No. 10,127,343.

(51) Int. Cl.
*G06F 17/50* (2006.01)
*H05K 1/02* (2006.01)
*H05K 3/46* (2006.01)

(52) U.S. Cl.
CPC ...... *G06F 17/5072* (2013.01); *G06F 17/5009* (2013.01); *G06F 17/5081* (2013.01); *G06F 17/50* (2013.01); *G06F 17/5018* (2013.01); *G06F 17/5068* (2013.01); *H05K 1/0298* (2013.01); *H05K 3/46* (2013.01)

(58) Field of Classification Search
CPC .. G06F 17/5009; G06F 17/50; G06F 17/5068; G06F 17/14; G06F 17/5018; G06F 17/5081; G06F 17/5072
See application file for complete search history.

(56) References Cited

U.S. PATENT DOCUMENTS

| | | | | |
|---|---|---|---|---|
| 5,552,995 A * | 9/1996 | Sebastian | ............ | B29C 33/3835 700/182 |
| 6,330,704 B1 * | 12/2001 | Ljung | ................ | G06F 17/5018 716/115 |
| 6,721,614 B2 * | 4/2004 | Duncan | .................. | G06F 17/50 700/182 |
| 6,795,950 B2 * | 9/2004 | Matsushita | ............ | H05K 13/08 700/98 |
| 7,068,270 B1 * | 6/2006 | Chiu | ................... | G06F 17/5086 345/420 |

(Continued)

OTHER PUBLICATIONS

Yu et al.; Layout-based 3D solid modeling for IC; Year: 1995; 1995 International Symposium on VLSI Technology, Systems, and Applications. Proceedings of Technical Papers; pp. 108-112.*

*Primary Examiner* — Helen Rossoshek
(74) *Attorney, Agent, or Firm* — Mentor Graphics Corporation

(57) ABSTRACT

This application discloses a computing system implementing tools and mechanisms to generate a composite solid model for a set of parts and utilize the composite solid model during the layout process. The tools and mechanisms can identify multiple parts available for inclusion in a circuit design, combine component models corresponding to the multiple parts into a composite solid model, and place the composite solid model in the layout representation of the circuit design. The composite solid model can have physical dimensions that overlap with physical dimensions of the component models corresponding to the multiple parts.

18 Claims, 8 Drawing Sheets

(56) References Cited

U.S. PATENT DOCUMENTS

| | | | |
|---|---|---|---|
| 7,398,128 B2 * | 7/2008 | Arita | G06T 17/00 345/420 |
| 7,472,363 B1 * | 12/2008 | Chandra | G06F 17/5009 716/106 |
| 7,596,482 B2 * | 9/2009 | Murugan | G06F 17/5009 703/14 |
| 7,703,069 B1 * | 4/2010 | Liu | G03F 1/144 716/50 |
| 7,707,525 B2 * | 4/2010 | Varon-Weinryb | G06F 17/5018 716/136 |
| 7,870,534 B2 * | 1/2011 | Yamaguchi | G06F 17/5077 716/118 |
| 8,001,516 B2 * | 8/2011 | Smith | G06F 17/5068 716/100 |
| 8,249,736 B2 * | 8/2012 | Kelley | H05K 3/4638 438/614 |
| 8,674,470 B1 * | 3/2014 | Or-Bach | H01L 25/0657 257/499 |
| 8,744,810 B2 * | 6/2014 | Itoh | G06F 17/5018 700/97 |
| 8,868,380 B2 * | 10/2014 | Chauvin | G06F 17/50 700/98 |
| 9,311,443 B2 * | 4/2016 | Chidambarrao | G06F 17/5081 |
| 2004/0010766 A1 * | 1/2004 | Swope | G06F 17/5068 716/112 |
| 2008/0165188 A1 * | 7/2008 | Uraki | G06F 17/50 345/420 |
| 2008/0275672 A1 * | 11/2008 | Varon-Weinryb | G06F 17/5018 703/1 |
| 2009/0055789 A1 * | 2/2009 | McIlrath | G06F 17/5045 716/122 |
| 2009/0066366 A1 * | 3/2009 | Solomon | G06F 15/17387 326/41 |
| 2009/0177456 A1 * | 7/2009 | Jandhyala | G06F 17/5018 703/14 |
| 2009/0193370 A1 * | 7/2009 | Bantas | G06F 17/5036 716/136 |
| 2009/0326874 A1 * | 12/2009 | Nakamura | G06F 17/5009 703/1 |
| 2010/0217576 A1 * | 8/2010 | Bharath | G06F 17/5018 703/14 |
| 2011/0264416 A1 * | 10/2011 | Muller | G05B 19/418 703/1 |
| 2013/0298101 A1 * | 11/2013 | Chandra | G06F 17/50 716/136 |
| 2014/0282328 A1 * | 9/2014 | Fried | G06F 17/5081 716/112 |
| 2014/0297231 A1 * | 10/2014 | Georgescu | G06F 17/5009 703/1 |
| 2015/0026657 A1 * | 1/2015 | Fu | G06F 17/5081 716/136 |
| 2015/0105891 A1 * | 4/2015 | Golway | B29C 67/0055 700/98 |
| 2015/0178413 A1 * | 6/2015 | Gibson | G06F 17/50 703/1 |
| 2015/0356774 A1 * | 12/2015 | Gal | G06F 17/50 345/633 |
| 2016/0011040 A1 * | 1/2016 | Mifune | G01H 17/00 702/56 |
| 2016/0371402 A1 * | 12/2016 | Suiter | G06F 17/505 |

* cited by examiner

THREE-DIMENSIONAL COMPOSITE SOLID COMPONENT MODELING

RELATED APPLICATION

This application is a continuation-in-part of U.S. patent application Ser. No. 14/567,488, filed Dec. 11, 2014, which is incorporated by reference herein.

TECHNICAL FIELD

This application is generally related to electronic design automation and, more specifically, to three-dimensional composite solid component modeling.

BACKGROUND

The development of electronic devices with printed circuit boards typically involves many steps, known as a design flow. This design flow typically starts with a specification for a new circuit to be implemented with a printed circuit board. The specification of the new circuit can be transformed into a circuit design, such as a netlist, for example, by a schematic capture tool or by synthesizing a logical circuit design, sometimes referred to as a register transfer level (RTL) description of the circuit. The netlist, commonly specified in an Electronic Digital Exchange Format (EDIF), can describe nets or connectivity between various devices or instances in the circuit design.

The design flow continues by verifying functionality of the circuit design, for example, by simulating or emulating the circuit design and verifying that the results of the simulation or emulation correspond with an expected output from the circuit design. The functionality also can be verified by statically checking the circuit design for various attributes that may be problematic during operation of an electronic device built utilizing the circuit design.

Once the circuit design has been functionally verified, the design flow continues to design layout and routing, which includes placing and interconnecting various components or parts into a layout representation of a printed circuit board. This procedure can be implemented in many different ways, but typically, through the use of a layout tool, which can present a graphical view of the printed circuit board and allow a designer to drag or place parts from a library onto the layout representation of the printed circuit board. The layout tool can validate the electronic device and perform various design rule checks on placed parts to ensure that the electronic device can be effectively built.

Most layout tools support placement of parts from a variety of different suppliers, which can allow designers choice in selecting which parts to utilize in the layout representation of the printed circuit board. For example, when an electronic device manufacturer knows a certain supplier will provide the parts for production of an electronic device, the designers can select parts corresponding to that supplier for placement in the layout representation of the printed circuit board.

Often, however, the manufacturer will utilize multiple different suppliers for the same part during production of the electronic device, for example, based on the geographic location of the manufacturing, pricing of the parts, part availability, or the like. Since parts from different manufacturers may have equivalent electrical characteristics, but varying physical characteristics, post-design part substitution can render the electronic device unbuildable. For example, when a substituted part has a larger physical dimension it may be unable to fit inside of a device enclosure or unable to fit next to one or more adjacent components on a printed circuit board. Some designers attempt to compensate for potential part substitution during manufacture of the electronic device by pacing parts with additional spacing tolerances from each other and portions of the enclosure. While this technique can sometimes allow successful part interchangeability during production, it is not foolproof and leads to a larger and usually more expensive implementation of the electronic device.

SUMMARY

This application discloses a computing system implementing tools and mechanisms to generate a composite solid model, for a set of parts and utilize the composite solid model during the layout process instead of a component model specific to a single part. Since the layout of the circuit design can be checked against various design rules, the utilization of a composite solid model in the layout of the circuit design, an electronic device represented by the layout of the circuit design to be built or manufactured with any of the parts associated with the composite solid model.

The tools and mechanisms can generate and place a composite solid model in a layout representation of a circuit design by identifying multiple parts available for inclusion in a circuit design, combining component models corresponding to the multiple parts into a composite solid model, and placing the composite solid model in the layout representation of the circuit design. The composite solid model can have physical dimensions that overlap with physical dimensions of the component models corresponding to the multiple parts.

DETAILED DESCRIPTION

Illustrative Operating Environment

The execution of various electronic design automation processes according to embodiments of the invention may be implemented using computer-executable software instructions executed by one or more programmable computing devices. Because these embodiments of the invention may be implemented using software instructions, the components and operation of a generic programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads.

Figure 1:
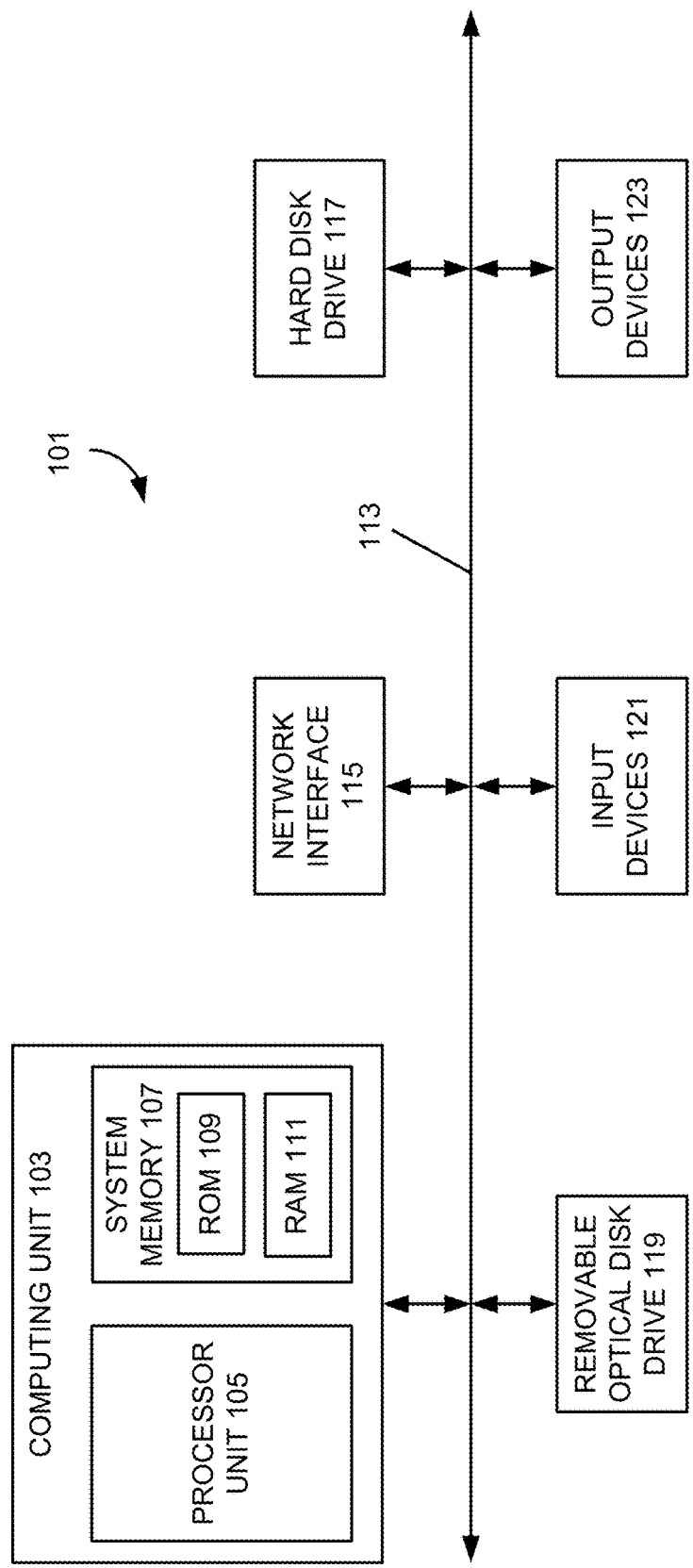
FIGS. 1 and 2 illustrate an example of a computer system of the type that may be used to implement various embodiments of the invention.

Various examples of the invention may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computer 101, one or more of the peripheral devices 115-123 may be internally housed with the computing unit 103. Alternately, one or more of the peripheral devices 115-123 may be external to the housing for the computing unit 103 and connected to the bus 113 through, for example, a Universal Serial Bus (USB) connection.

With some implementations, the computing unit 103 may be directly or indirectly connected to one or more network interfaces for communicating with other devices making up a network. The network interface translates data and control signals from the computing unit 103 into network messages according to one or more communication protocols, such as the transmission control protocol (TCP) and the Internet protocol (IP). Also, the interface may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the invention may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
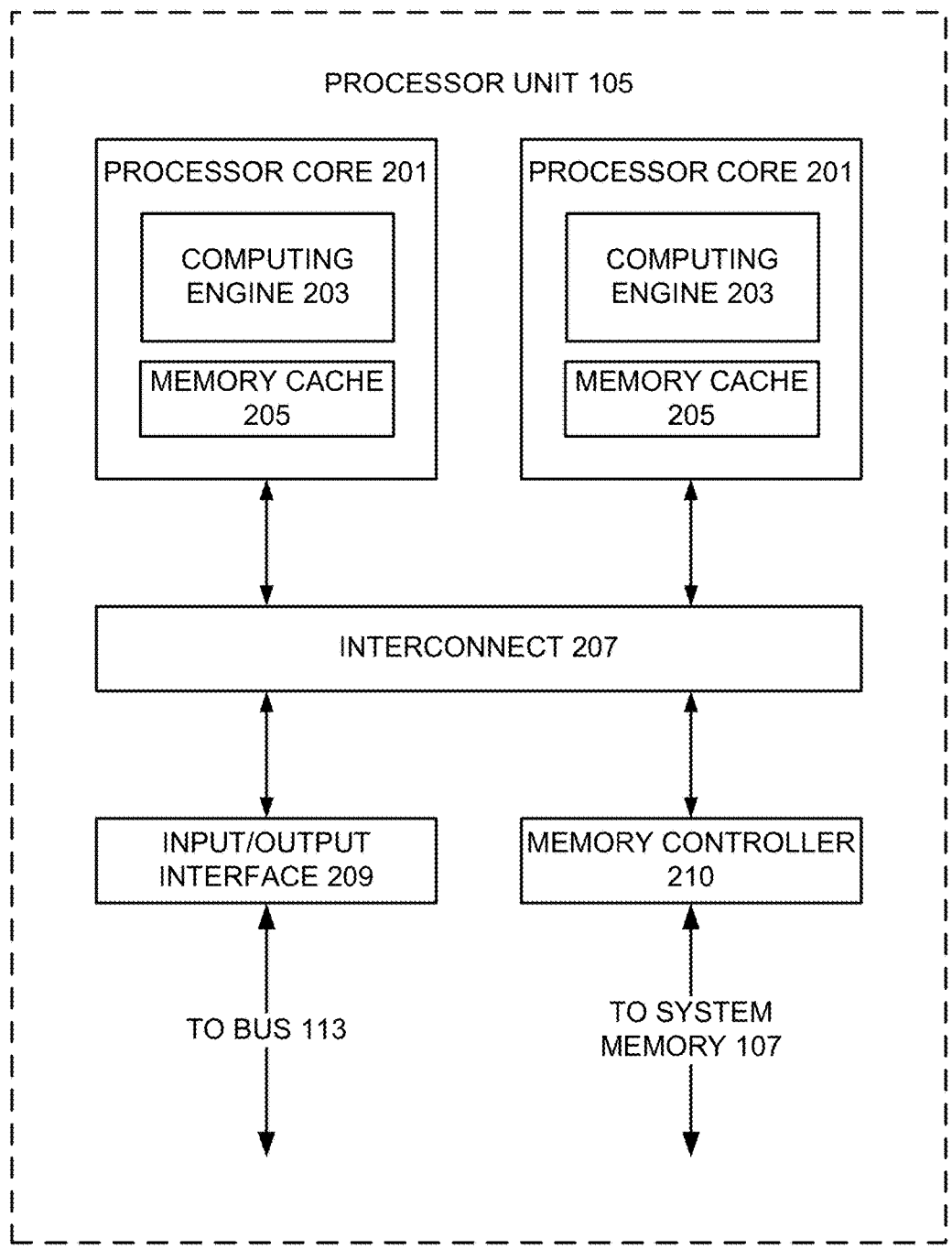

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 210 The input/output interface 209 provides a communication interface between the processor unit 201 and the bus 113. Similarly, the memory controller 210 controls the exchange of information between the processor unit 201 and the system memory 107. With some implementations of the invention, the processor units 201 may include additional components, such as a high-level cache memory accessible shared by the processor cores 201.

It also should be appreciated that the description of the computer network illustrated in FIG. 1 and FIG. 2 is provided as an example only, and it not intended to suggest any limitation as to the scope of use or functionality of alternate embodiments of the invention.

Distributed Design System

Figure 3:
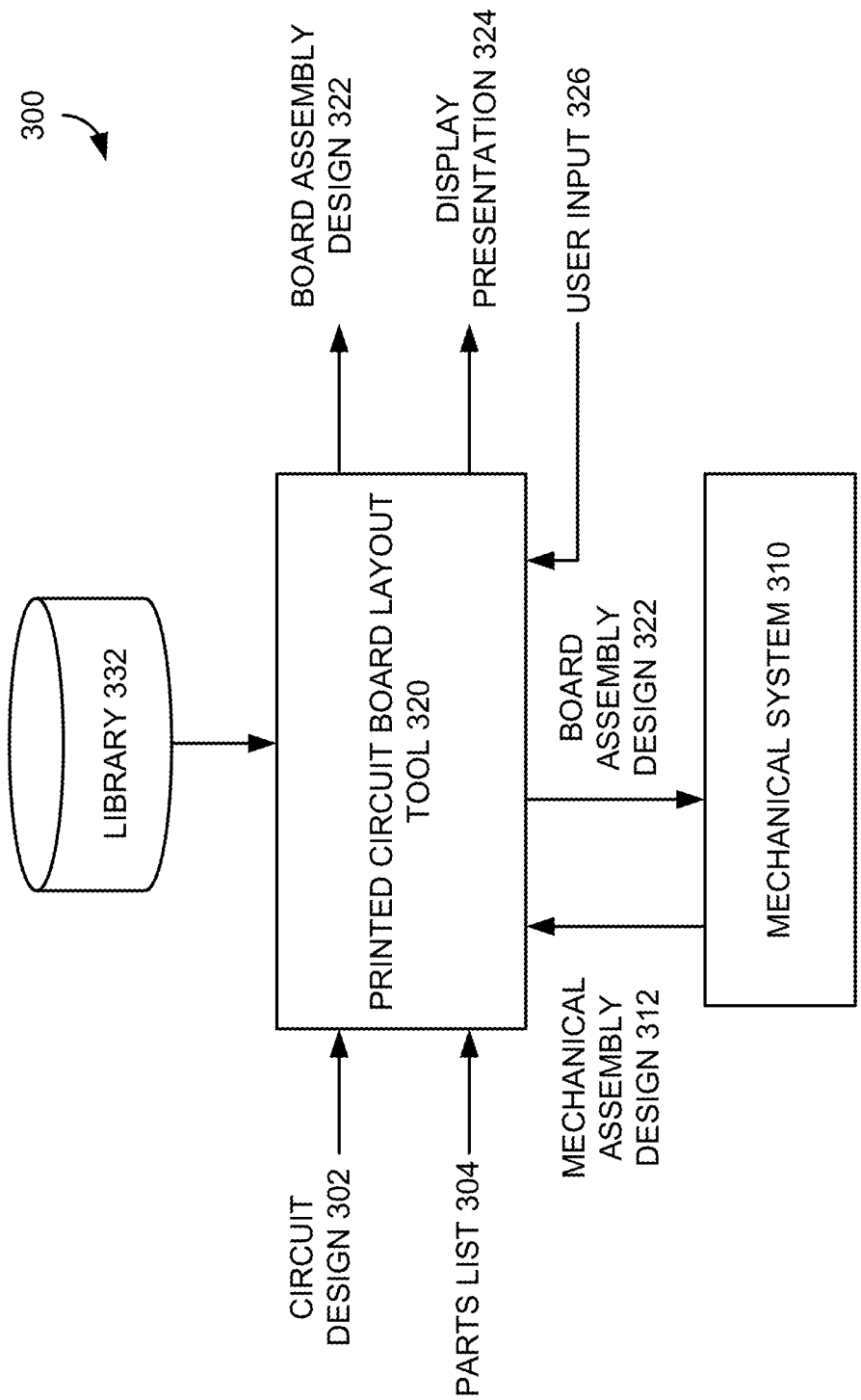
FIG. 3 illustrates an example of a design system according to various embodiments of the invention.

FIG. 3 illustrates an example of a design system 300 according to various embodiments of the invention. Referring to FIG. 3, the design system 300 can be a distributed design environment, which allows different aspects of product design to be performed by different communicating tools or systems. For example, the design system 300 can include a mechanical system 310 to develop a mechanical assembly design 312 for a product, and a printed circuit board layout tool 320 to develop a board assembly design 322 for an electronic device, which can be included in the product.

The mechanical assembly design 312 can describe various physical design elements associated with the product, such as a design for a housing of the product. In some examples, the design for the housing can include locations and dimensions of electronic system(s) and physical interfaces, such as a display device, a touchscreen, an image capture device, input/output devices, electrical ports, audio devices, or the like. The mechanical assembly design 312 also can describe physical mounting information for the physical interfaces and electronic system(s), describe physical connectivity of the physical interfaces and electronic system(s) to each other and to the housing of the product, describe a presence of mechanical heat dissipation devices in the product, or the like.

The board assembly design 322 can describe the electronic device for the product in terms of various components placed and interconnected on a representation of a printed circuit board. The printed circuit board layout tool 320 can provide a design environment to layout a circuit design 302, which can describe the electronic device as sets of interconnected components, into the board assembly design 322 by placing parts or components from a parts list 304 onto the representation of printed circuit board. As will be described below in greater detail, the printed circuit board layout tool 320 can combine a set of parts or components into a composite solid model for the parts or components, which can be placed onto the representation of the printed circuit board. Since the composite solid model can represent a multiple physical representations of the set of parts or components, the printed circuit board can be built with any of the parts or components utilized in the composite solid model. Embodiments of the compositing of solid models for parts and components will be described below in greater detail.

The mechanical system 310 and the printed circuit board layout tool 320 can exchange design information with each other. For example, the printed circuit board layout tool 320 can output the board assembly design 322 to the mechanical system 310 or a memory system (not shown) directly or indirectly accessible by the mechanical system 310. Likewise, the mechanical system 310 can output the mechanical assembly design 312 to the printed circuit board layout tool 320 or a memory system (not shown) directly or indirectly accessible by the printed circuit board layout tool 320. The mechanical system 310 and the printed circuit board layout tool 320 can share their respective designs with each other at any point during the design process, for example, through an exchange of design files in the form of STEP (Standard for the Exchange of Product model data) and/or SAT (Standard ACIS Text) files. The format of a STEP file, in some embodiments, can be defined in (International Organization for Standardization) ISO 10303-21, entitled "Industrial automation systems and integration—Product data representation and exchange—Part 21: Implementation methods: Clear text encoding of the exchange structure."

The printed circuit board layout tool 320 can analyze the mechanical assembly design 312 to identify mechanical constraints that can limit or constrain the board assembly design 322. As discussed above, the mechanical constraints can include a description of an enclosure in which the board assembly design 322 is to fit in the mechanical assembly design 312, locations and description of fasteners utilized to adhere a printed circuit board manufactured according to the board assembly design 322 to a housing described in the mechanical assembly design 312, presence and location of other mechanical devices, such as heat dissipation devices or physical interfaces in the mechanical assembly 312, or the like. The printed circuit board layout tool 320 can develop a set of design rules based on the mechanical constraints identified or parsed from the mechanical assembly design 312. During layout operations, the printed circuit board layout tool 320 can check portions of the board assembly design 322 for violations of the developed set of design rules as well as any other electro-mechanical design rules populated into or accessible by the printed circuit board layout tool 320.

The mechanical system 310 can analyze the board assembly design 322 to determine whether the layout of the electronic device described in the board assembly design 322 remains congruent with the mechanical assembly design 312. This exchange of design files between the mechanical system 310 and the printed circuit board layout tool 320 can allow for a dynamic understanding of how alterations or additions to the mechanical assembly 312 and the board assembly design 322 can affect design efforts by other groups developing different portions of the product.

The printed circuit board layout tool 320 can receive the circuit design 302, such as a netlist, which can describe components in an electronic device and the connectivity of those components to each other. In some embodiments, the netlist can be generated by a schematic capture tool or by synthesizing a logical circuit design, sometimes referred to as a register transfer level (RTL) description of the circuit. The netlist can be specified in an Electronic Digital Exchange Format (EDIF), which can describe nets or connectivity between various components or instances in the circuit design 302. The printed circuit board layout tool 320 also can receive the parts list 304 including multiple parts that can correspond to the components described in the circuit design 302. Although FIG. 3 shows the printed circuit board layout tool 320 receiving the circuit design 302 and the parts list 304, in some embodiments, the printed circuit board layout tool 320 can generate the circuit design 302 and/or parts list 304 internally.

The printed circuit board layout tool 320 can output a display presentation 324 that, when displayed by a display device, can provide an user interface to the design environment, allowing the printed circuit board layout tool 320 to generate the board assembly design 322 in response to user input 326. As will be discussed below in greater detail, the display presentation 324 can include a graphical display window including at least one representation of the board assembly design 322 and include various tools or embedded functionality that can allow placement of parts or components from the parts list 304 into the board assembly design 322.

The board assembly design 322 initially can represent a blank print circuit board, for example, having dimensions corresponding to one or more of the mechanical constraints gleaned from the mechanical assembly design 312. The printed circuit board layout tool 320 can receive user input 326, for example, based on the display presentation 324, which can prompt the printed circuit board layout tool 320 to perform various updates to the board assembly design 322 based on the circuit design 302, such as place parts selected or composited from the parts list 304 in the board assembly design 322, route traces between the placed parts or composite parts, or the like. In some embodiments, the printed circuit board layout tool 320, in response to a user selection of a part from the parts list 304, can access a library 332 to identify a component model corresponding to the selected part capable of being placed in the representation of the board assembly design 322. In other embodiments, the printed circuit board layout tool 320, in response to a user selection of a multiple parts from the parts list 304, can access a library 332 to identify component models corresponding to the selected parts, combine those component models into a composite solid model for the selected parts that is capable of being placed in the representation of the board assembly design 322.

The printed circuit board layout tool 320 can perform various design rule checks on the board assembly design 322 to determine whether the updates in the board assembly design 322 violate any design rules. For example, the printed circuit board layout tool 320 can review locations and characteristics of component models or composite solid models placed in the representation of the printed circuit board to determine whether the component models or composite solid models, as placed, conform to the design rules. The printed circuit board layout tool 320 can update the display presentation 324 based on the user input 326, for example, to illustrate the placement of a selected part or route of a trace line and highlight conformance or lack thereof with at least one of the design rules, which can be displayed or presented by the display device. This interactive design process can continue until layout of the circuit design 302 has been completed and thus the printed circuit board layout tool 320 has generated the board assembly design 322 congruent with the mechanical assembly design 312. Since the mechanical system 310 and the printed circuit board layout tool 320 can exchange their respective designs with each other at any time during the design process, any changes in one design that conflict with another design can be caught and rectified earlier in the process.

Printed Circuit Board Layout Tool with Composite Component Modeling

Figure 4:
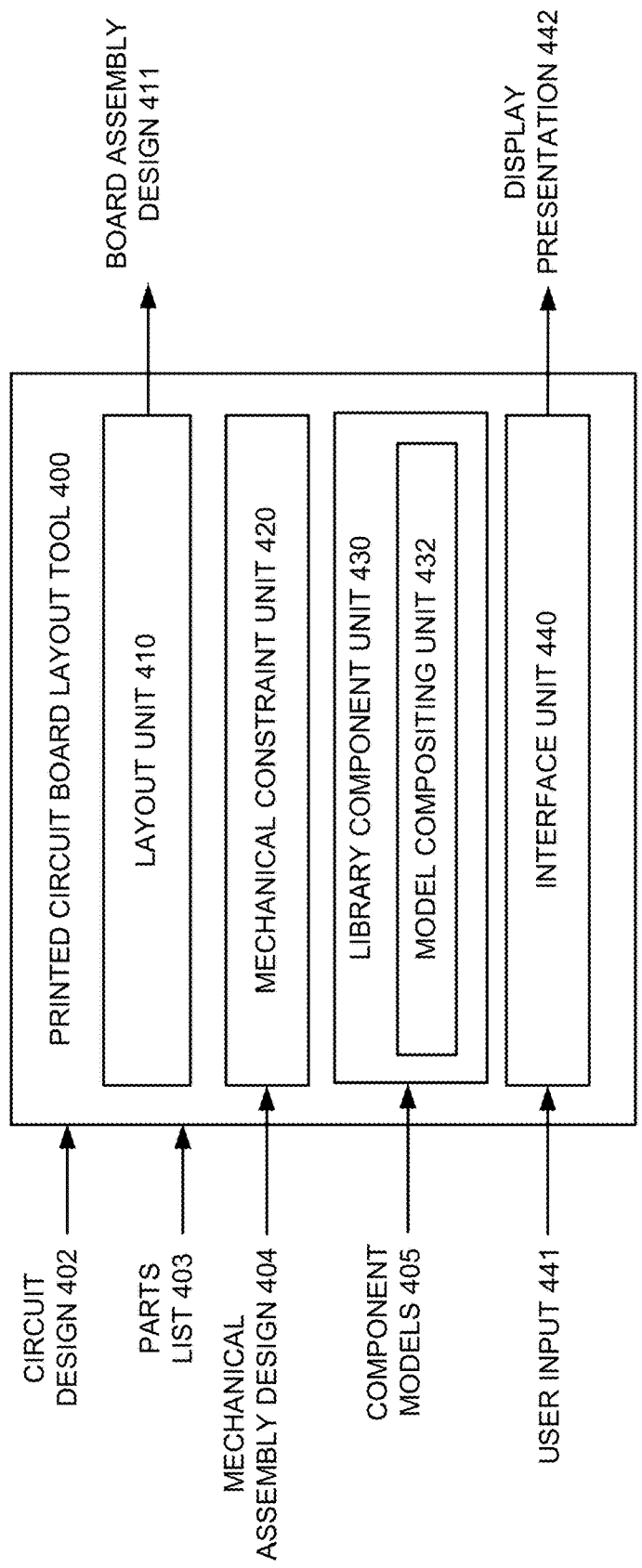
FIG. 4 illustrates an example of a printed circuit board layout tool according to various embodiments of the invention.

FIG. 4 illustrates an example of a printed circuit board layout tool 400 according to various embodiments of the invention. Referring to FIG. 4, the printed circuit board layout tool 400 can include a layout unit 410 to layout a circuit design 402 with parts from a parts list 403, which generates a board assembly design 411. The circuit design 402, such as a netlist, can describe components in an electronic device and the connectivity of those components to each other. In some embodiments, the netlist can be generated by a schematic capture tool or by synthesizing a logical circuit design, sometimes referred to as a register transfer level (RTL) description of the circuit. The netlist can be specified in an Electronic Digital Exchange Format (EDIF), which can describe nets or connectivity between various components or instances in the circuit design 402. The parts list 403 can include multiple parts that can correspond to the components described in the circuit design 402. Although FIG. 4 shows the printed circuit board layout tool 400 receiving the circuit design 402 and the parts list 404, in some embodiments, the printed circuit board layout tool 400 can generate the circuit design 402 and/or parts list 404 internally.

In some embodiments, the layout unit 410 can generate a layout representation of the circuit design 402, which can be a two-dimensional version of the board assembly design 411. The layout representation of the circuit design 402 can, for example, be embodied in a 2.5-dimensional data model with 2.5-dimensional component models, such as component models 405. The layout representation of the circuit design 402 also can include a two-dimensional graphical presentation, for example, based on the 2.5-dimensional data model. In some embodiments, the layout unit 410 can include a two-dimensional kernel, for example, implemented by a computing system in response to computer-executable instructions, which can generate a 2.5-dimensional data model of the board assembly design 411.

In some embodiments, the layout unit 410 also can generate a layout representation of the circuit design 402, which can be a three-dimensional version of the board assembly design 411. The layout representation of the circuit design 402 can, for example, be embodied in a three-dimensional data model. The three-dimensional data model can include three-dimensional characteristics and parameters of the printed circuit board and three-dimensional component solid models, such as component models 405, placed on the printed circuit board. The three-dimensional component solid models can describe a three-dimensional physical structure of each component placed on in the three-dimensional version of the board assembly design 411, including specific configurations of the connectors. The layout representation of the circuit design 402 also can include a three-dimensional graphical presentation, for example, based on the three-dimensional data model, which, in some embodiments, can provide a photo realistic visualization of the three-dimensional version of the board assembly design 411. In some embodiments, the layout unit 410 can include a three-dimensional kernel, for example, implemented by a computing system in response to computer-executable instructions, which can generate a three-dimensional data model of the board assembly design 411.

The printed circuit board layout tool 400 can identify mechanical constraints from a mechanical assembly design 404. The printed circuit board layout tool 400 can develop design rules for an electronic device corresponding to the mechanical constraints. In some embodiments, the printed circuit board layout tool 400 can include a mechanical constraint unit 420 to receive the mechanical assembly design 404, for example, directly from a mechanical design system or indirectly via an interface or memory system. In some embodiments, the mechanical assembly design 404 can be a design file in the form of a STEP file and/or a SAT file. Although FIG. 4 shows the mechanical constraint unit 420 as being separate from the layout unit 410, in some embodiments, the one or more instances of the mechanical constraint unit 420 can be included in the layout unit 410.

The mechanical constraint unit 420 can analyze the mechanical assembly design 404 to identify mechanical constraints that can limit or constrain layout of the circuit design 402 into the board assembly design 411. In some embodiments, the mechanical constraints can include a description of an enclosure that the board assembly design 411 is to fit into, locations and description of fasteners utilized to adhere a printed circuit board manufactured according to the board assembly design 411 to a housing described in the mechanical assembly design, presence and location of other mechanical devices, such as heat dissipation devices or physical interfaces in the mechanical assembly, or the like.

The mechanical constraint unit 420 can develop a set of design rules based on the mechanical constraints identified or parsed from the mechanical assembly design. The set of design rules can correspond to the mechanical constraints, such that when a layout of a print circuit board violates a design rule, the layout of a print circuit board would be inconsistent with the mechanical assembly design from which the mechanical constraints were derived or identified. The printed circuit board layout tool 400 can incorporate or associate the set of design rules developed by the mechanical constraint unit 420 with a master set of electro-mechanical design rules utilized by the printed circuit board layout tool 400 in design rule checks.

The printed circuit board layout tool 400 can include an interface unit 440 to output a display presentation 442 that, when displayed by a display device, can provide a user interface to the design environment. The display presentation 442 can include a graphical display window including at least one layout representation of the board assembly design 411 from the layout unit 410 and include various tools or embedded functionality that can allow placement of parts or components from the parts list 403 into the layout representation of the board assembly design 411. In some embodiments, the interface unit 440 can receive a two-dimensional layout representation and/or a three-dimensional layout representation of the board assembly design 411 from the layout unit 410 and selectively insert the recited layout representations in the display presentation 442. Although FIG. 4 shows the interface unit 440 as being separate from the layout unit 410, in some embodiments, the one or more instances of the library component unit 430 can be included in the interface unit 440.

Figure 5:
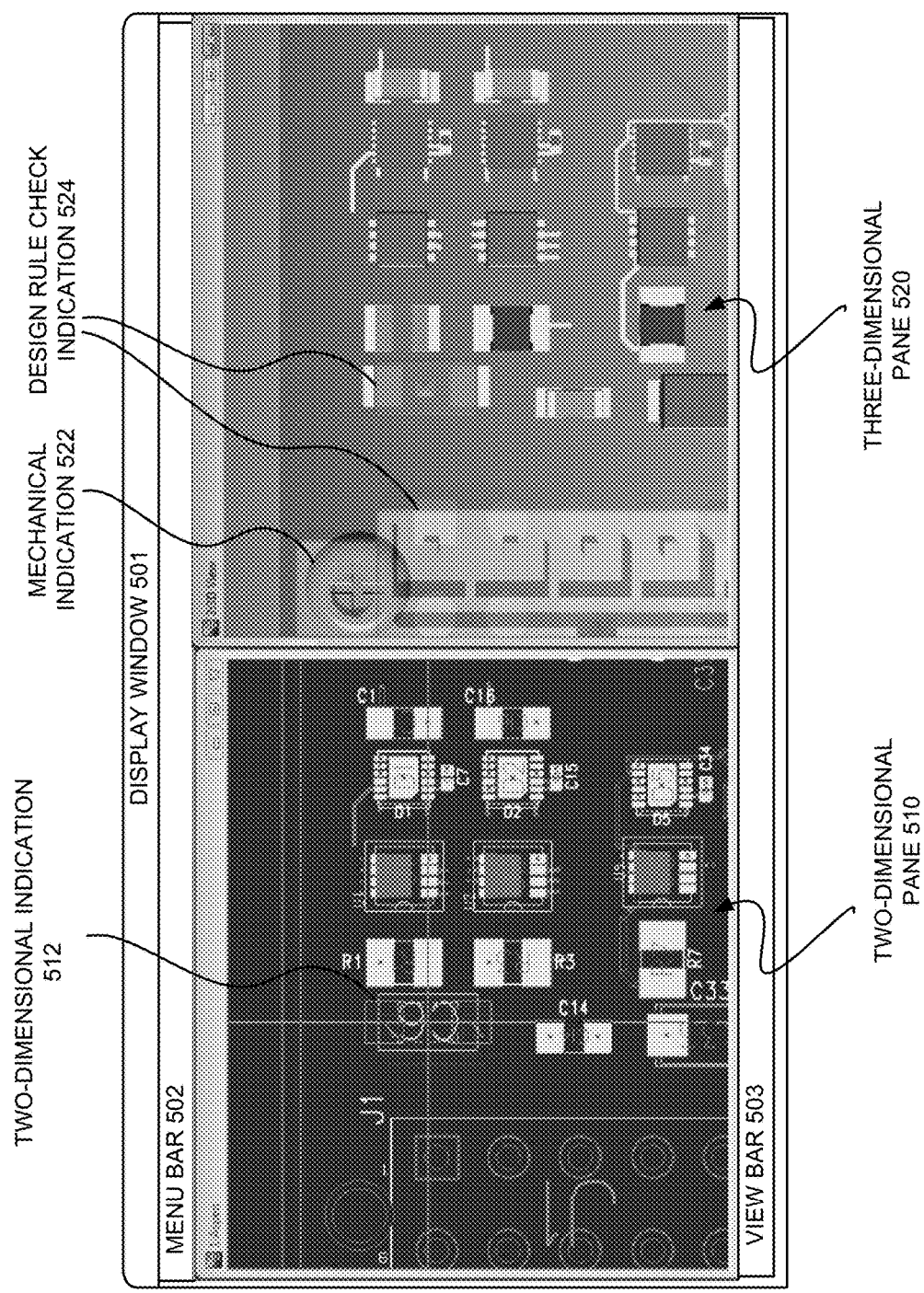
FIG. 5 illustrates an example implementation of a display window presenting multiple representations of different printed circuit board layouts according to various embodiments of the invention.

FIG. 5 illustrates an example implementation of a display window presenting multiple representations of different printed circuit board layouts according to various embodiments of the invention. Referring to FIG. 5, the display window 501 can include a two-dimensional pane 510 and a three-dimensional pane 520. The two-dimensional pane 510 can include a two-dimensional graphical view of a board assembly design. The three-dimensional pane 520 can include a three-dimensional graphical view of the same board assembly design. In some embodiments, the two-dimensional graphical view and three-dimensional graphical view can be synchronized, for example, that they include the same components and traces placed in the same portions of the board assembly design. The two-dimensional pane 510 and the three-dimensional pane 520 can also be synchronized in which view of the board assembly design they present, for example, where a change in view in one of the panes prompts a corresponding change in the other pane. In other words, two-dimensional pane 510 and the three-dimensional pane 520 can be interrelated, with a selection in one pane causing corresponding portions of the other pane to automatically scroll into view.

The two-dimensional graphical view in the two-dimensional pane 510 can include various graphical representations of components and routing traces as placed in the board assembly design. The three-dimensional graphical view in the three-dimensional pane 520 can include various graphical representations of solid model components and routing traces as placed in the board assembly design. The three-dimensional graphical view in the three-dimensional pane 520 can include mechanical indications 522, which can show mechanical features, such as through holes and corresponding fasteners. Since the shape of the two-dimensional components in the two-dimensional pane 510 can differ from the three-dimensional component solid models in the three-dimensional pane 520, in some embodiments, a two-dimensional indication 512, such as an outline of the shape of the three-dimensional component, can be overlaid in the two-dimensional pane 510. The three-dimensional graphical view in the three-dimensional pane 520 also can provide a design rule check indication 524, such as by altering a shape, color, or otherwise visually augmenting the three-dimensional graphical view to annunciate a consistence or lack thereof to one or more design rules. When a placed component has a mechanical-based design rule that limits its height, for example, due to a housing or enclosure requirement or due to an adjacently placed component part (a manufacturing difficulty or impossibility requirement), the design rule check indication 524 can visually indicate whether the placed component violates that mechanical-based design rule, encroaches on the mechanical-based design rule, or is consistent with the mechanical-based design rule. Embodiments of the design rule check indication 524 will be described below in greater detail.

The display window 501 can include a menu bar 502 having various mechanisms to selectively enable layout operations, graphical manipulation, or the like, in at least one of the two-dimensional pane 510 or the three-dimensional pane 520. The display window 501 also can include a view bar 503, which can present mechanisms that, when utilized, can prompt the display window 501 to alter the view presented in at least one of the panes 510 or 520. For example, the view bar 503 includes mechanisms that can prompt rotation of the graphics, a change of viewing angle, introduce cut planes, allow for measurement with point, axis, facement, or the like, in at least one of the panes 510 or 520.

Figure 6:
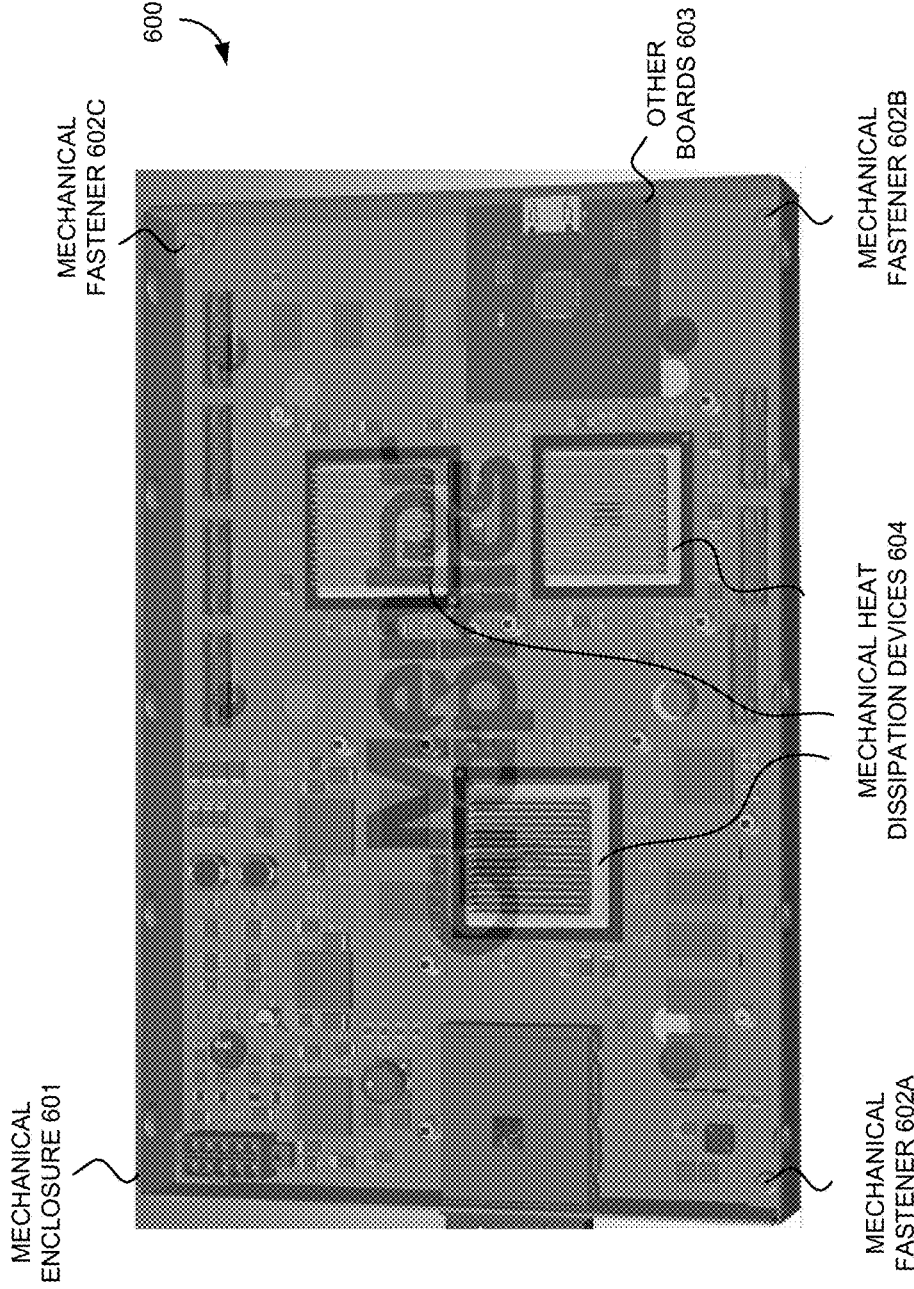
FIG. 6 illustrates an example three-dimensional representation of a printed circuit board layout with mechanical constraints according to various embodiments of the invention.

FIG. 6 illustrates an example three-dimensional representation 600 of a printed circuit board layout with mechanical constraints according to various embodiments of the invention. Referring to FIG. 6, the three-dimensional representation 600 of the printed circuit board layout can include various three-dimensional component solid models that represent parts in the printed circuit board layout. The three-dimensional representation 600 of the printed circuit board layout also can include a representation of mechanical features, for example, as derived or identified from a mechanical assembly design of a product configured to the include the printed circuit board shown in the three-dimensional representation 600.

The representation of mechanical features can include a description of a mechanical enclosure 601, for example, which can be configured to house the printed circuit board shown in the three-dimensional representation 600. The representation of mechanical features can include a description of mechanical fasteners, such as screws, 602A-602C, which can be configured to affix the printed circuit board shown in the three-dimensional representation 600 to the mechanical enclosure 601 or other portions of the product. The representation of mechanical features can include a description of additional devices, such as other printed circuit board 603, mechanical heat dissipation devices 604, or the like, configured to couple to the printed circuit board shown in the three-dimensional representation 600. By including the representation of mechanical features along with the printed circuit board layout in the three-dimensional representation 600, layout operations can be conducted in a manner that avoids conflict with a mechanical constraint or inconsistency with a mechanical assembly design configured to house or couple to the printed circuit board shown in the three-dimensional representation 600.

Referring back to FIG. 4, the layout unit 410 can initially represent the board assembly design 411 as a blank printed circuit board, for example, having dimensions corresponding to one or more of the mechanical constraints gleaned from the mechanical assembly design. As discussed above, the layout unit 410 can represent of the board assembly design 411 with a single data model or with multiple different data models, for example, a 2.5-dimensional data model and a three-dimensional data model.

The layout unit 410 can receive user input 441, for example, based on the display presentation 442, which can prompt the layout unit 410 to perform various updates to the data models corresponding to the board assembly design 411. In some embodiments, the user input 441 can identify at least one part selected from the parts list 403 and identify a location in the board assembly design 411 for placement of the selected part. The layout unit 410 can place at least one component model that corresponds to the selected part in the data model corresponding to the identified location in the board assembly design 411, route traces between the placed parts based on the connectivity in the circuit design 402, or the like.

The printed circuit board layout tool 400 can include a library component unit 430 to identify one or more component models 405 that correspond to the selected part. In some embodiments, the layout unit 410 can provide an indication of the selected part to the library component unit 430, and the library component unit 430 can access a library (not shown) to identify a component model corresponding to the selected part capable of being placed in the board assembly design 411. Since the library can include 2.5-dimensional component models and/or three-dimensional solid component models, in some embodiments, the layout unit 410 also can provide an indication of which type of component model 405 for the library component unit 430 to retrieve from the library. Although FIG. 4 shows the library component unit 430 as being separate from the layout unit 410, in some embodiments, the one or more instances of the library component unit 430 can be included in the layout unit 410.

The library component unit 430 can include a model compositing unit 432 to generate a composite solid model from the component models 405 corresponding to multiple parts in the parts list 403. In some embodiments, the composite solid model can have physical dimensions that are based on the component models 405 corresponding to the multiple parts. Since the component models 405 corresponding to the multiple parts can have at least some physical dimensions that are non-overlapping, the model compositing unit 432 can combine the component models 405 corresponding to the selected parts into a composite solid model having physical dimensions that overlap with all of the component models 405 corresponding to the multiple parts. In some instances, the physical dimensions of the composite solid model can be "worse case" physical dimensions of the component models 405 corresponding to the multiple parts. The layout unit 410 can place the composite solid model in the data model corresponding to the identified location in the board assembly design 411, route traces between the placed parts based on the connectivity in the circuit design 402, or the like. Embodiments of compositing component models into a composite solid model will be described below in greater detail.

Figure 7:
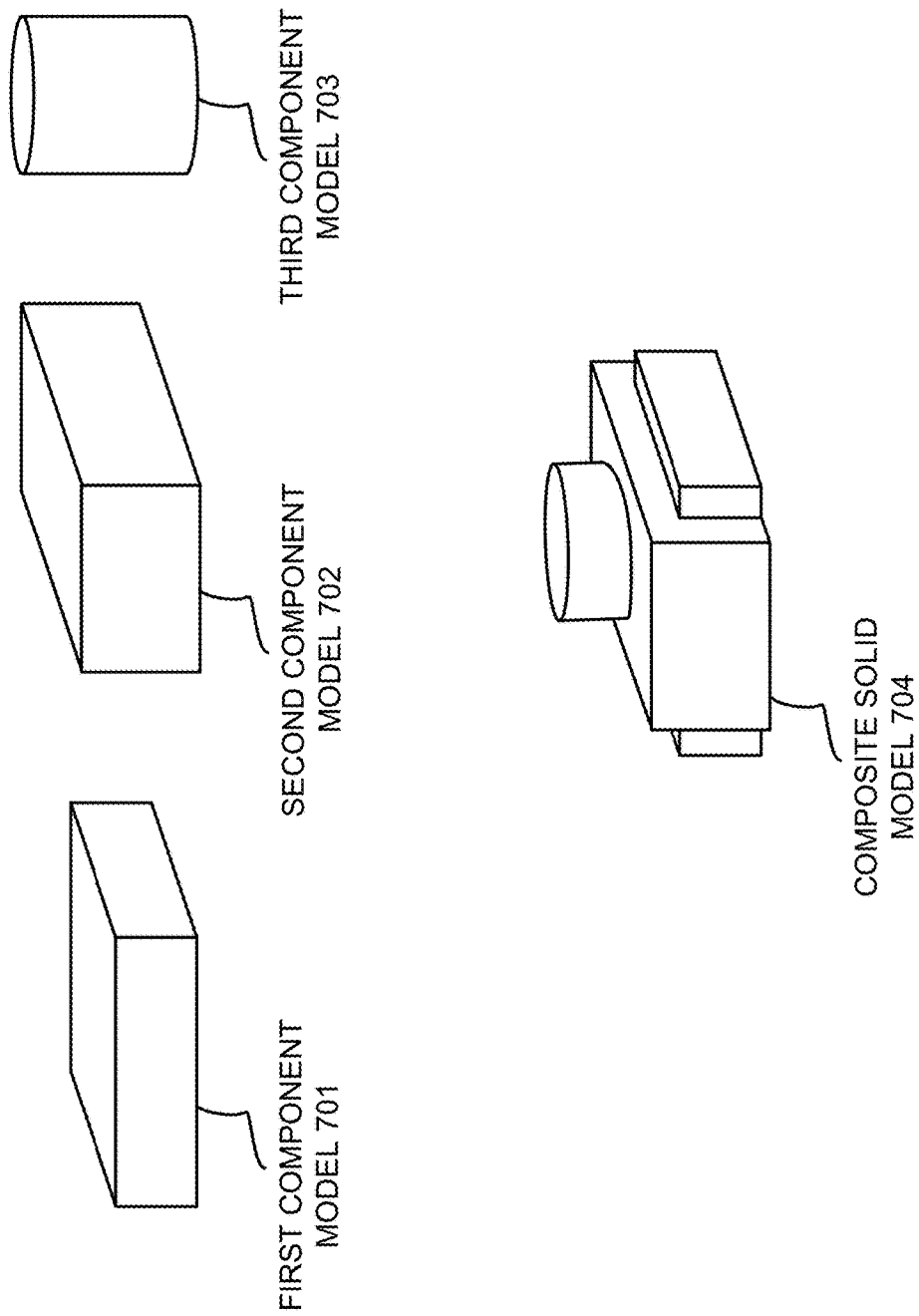
FIG. 7 illustrates an example compositing of component solid models for use in a printed circuit board layout according to various embodiments of the invention.

FIG. 7 illustrates an example compositing of component solid models for use in a printed circuit board layout according to various embodiments of the invention. Referring to FIG. 7, a group of component models, for example, including a first component model 701, a second component model 702, and a third component model 703, may have equivalent electrical characteristics, but varying physical characteristics or dimensions. The first component model 701, the second component model 702, and the third component model 703 can be described as three-dimensional representations of each part placed in a three-dimensional version of the board assembly design. When the first component model 701, the second component model 702, and the third component model 703 are presented by a display device, in some embodiments, the first component model 701, the second component model 702, and the third component model 703 can be photo-realistic versions of the physical structures of the corresponding parts.

The first component model 701, the second component model 702, and the third component model 703 can be composited or combined to form a composite solid model 704, which can have physical dimensions, in a three-dimensional representation, corresponding to a "worst case" physical representation of the first component model 701, the second component model 702, and the third component model 703. The "worst case" physical representation can mean that the physical dimensions of the composite solid model 704 overlap with each of the first component model 701, the second component model 702, and the third component model 703.

Referring back to FIG. 4, in some embodiments, the model compositing unit 432 can generate a composite solid model from component models 405 based on a selection of the multiple parts from the parts list 403. For example, when the user input 441 selects the multiple parts from the parts list 403, the library component unit 430 can identify component models 405 that correspond to the selected parts and the model compositing unit 432 can combine those component models 405 into the composite solid model.

In other embodiments, the model compositing unit 432 can generate composite solid model from the component models 405 prior to any user selection of parts. The library component unit 430 can utilize the pre-generated composite solid models in a variety of ways. For example, the library component unit 430 can present the pre-generated composite solid models for user selection. In other examples, when the user input 441 selects at least one part from the parts list 403 having a component model, the library component unit 430 can determine whether the component model is related to one or more pre-generated composite solid models and utilize one of the pre-generated composite solid models instead of the component model corresponding to the selected part.

The printed circuit board layout tool 400 can analyze the layout of the electronic system for congruency with the design rules. For example, the layout unit 410 can perform various design rule checks on the board assembly design 411 to determine whether the updates in the board assembly design 411 violate any design rules or their associated electro-mechanical constraints. The electro-mechanical constraints can include at least one electrical constraint or mechanical constraint for the board assembly design 411. In some embodiments, the layout unit 410 can review locations and characteristics of component models placed in the data model of the board assembly design 411 to determine whether the component models, as placed, conform to the design rules. The layout unit 410 can provide some granular user options for its design rule checking, for example, allowing user control over which portions of the board assembly design 411 to check for consistency with the design rules. For example, the layout unit 410 can compare different portions of the printed circuit board described in the board assembly design 411, such as a printed circuit board assembly, a component on the printed circuit board, a bond wire on the printed circuit board, a particular portion of the printed circuit board itself, such as a board edge, or the like, with each other. The layout unit 410 also can compare different portions of the printed circuit board described in the board assembly design 411 with other portions of the product, such as other printed circuit boards in the product, mechanical constraints derived or identified from the mechanical assembly design 404, or the like.

The layout unit 410 can update the display presentation 442 based on the user input 441, for example, to illustrate the placement of a selected part or route of a trace line and highlight conformance or lack thereof with at least one of the design rules. This interactive design process can continue until layout of the circuit design 402 has been completed and thus the layout unit 410 has generated the board assembly design 411 congruent with the mechanical assembly design 404.

Figure 8:
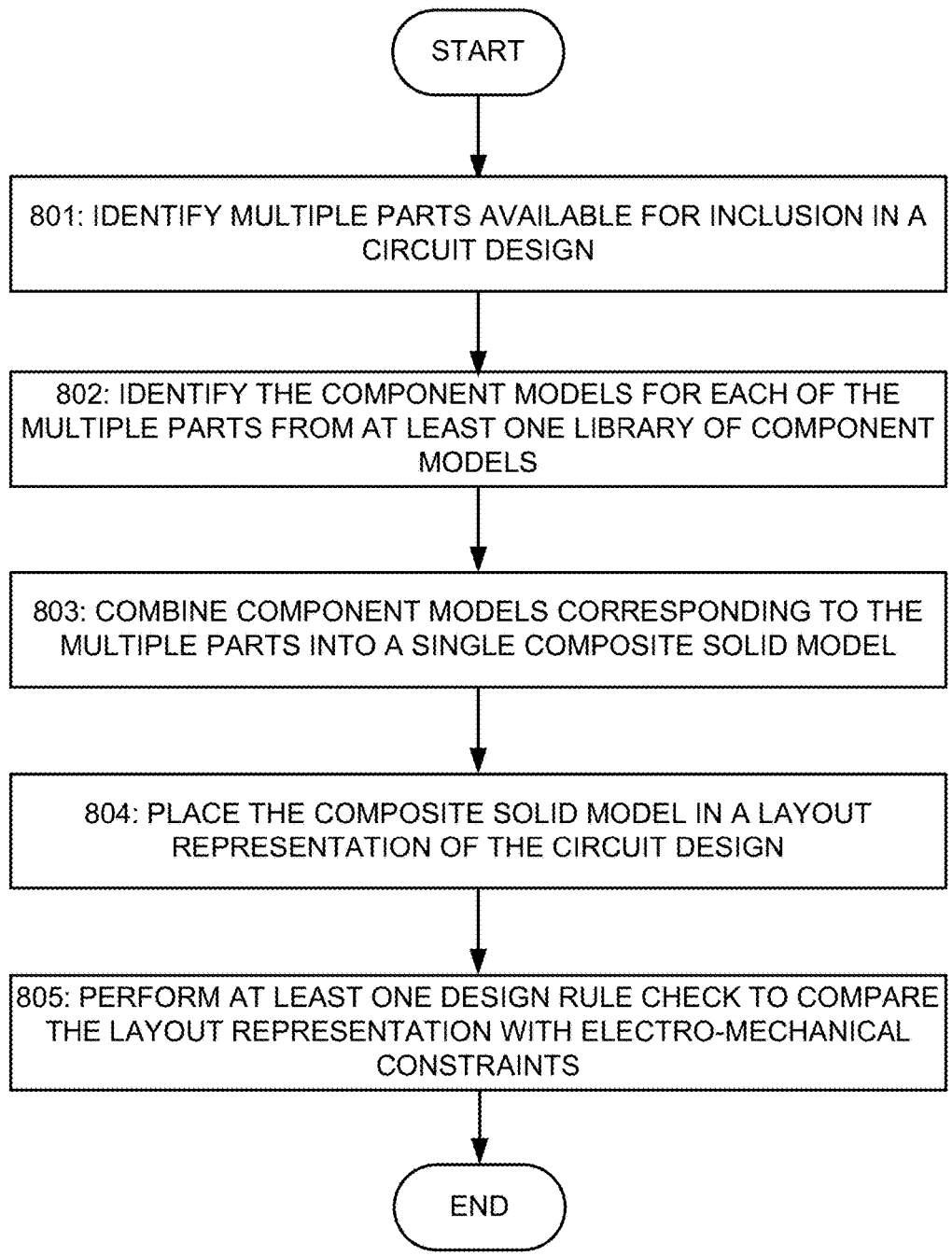
FIG. 8 illustrates an example flowchart for compositing of component solid models for use in a printed circuit board layout according to various embodiments of the invention.

FIG. 8 illustrates an example flowchart for compositing of component solid models for use in a printed circuit board layout according to various embodiments of the invention. Referring to FIG. 8, in a block 801, a computing system can identify multiple parts available for inclusion in a circuit design. In some embodiments, the computing system can receive user input, for example, based on the display presentation, which can identify multiple parts selected from a parts list, and optionally, identify a location in the board assembly design for placement of a composite solid model corresponding to the selected parts. The user input can prompt the computing system to perform various updates to the data models corresponding to a board assembly design.

In a block 802, the computing system can identify the component models for each of the multiple parts. In some embodiments, the computing system can access at least one library (not shown) to identify the component models corresponding to the selected parts capable of being placed in the board assembly design.

In a block 803, the computing system can combine component models corresponding to the multiple parts into a single composite solid model. In some embodiments, the composite solid model can correspond to a three-dimensional representation of a combination of physical dimensions of the multiple parts, such that the composite solid model has physical dimensions that overlap with physical dimensions of the component models corresponding to the multiple parts. In some instances, the physical dimensions of the composite solid model can be "worse case" physical dimensions of the component models corresponding to the multiple parts.

In a block 804, the computing system can place the composite solid model in a layout representation of the circuit design. In some embodiments, the computing system can place the composite solid model in the layout representation of the circuit design by augmenting a data model associated with the layout representation of the circuit design to include the composite solid model, for example, at the location specified in user input.

In a block 805, the computing system can perform at least one design rule check to compare the layout representation with electro-mechanical constraints.

The design rule check can include the computing system performing an analysis of the layout in the circuit design for congruency with the design rules. For example, the computing system can perform various design rule checks on the board assembly design to determine whether the update in the board assembly design, for example, due to placement of a composite solid model, violates any design rules or their associated electro-mechanical constraints. The electro-mechanical constraints can include at least one electrical constraint or mechanical constraint for the board assembly design. In some embodiments, the computing system can review locations and characteristics of composite solid models placed in the data model of the board assembly design to determine whether they, as placed, conform to the design rules.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
    selecting, by a computing system, multiple parts having corresponding component models stored in a library accessible by the computing system, wherein each component model, when placed in a layout representation of a circuit design describing an electronic device, represents a single one of the parts;
    generating, by the computing system, a composite solid model that represents a composite part, wherein the composite solid model describes physical dimensions of the composite part that correspond to an overlapping combination of physical dimensions of the selected parts described in the component models, and wherein the composite solid model, when placed in the layout representation of the circuit design, represents the composite part; and
    placing, by the computing system, the composite solid model in the layout representation of the circuit design, wherein the electronic device, when manufactured according to the layout representation of the circuit design, includes one of the selected parts corresponding to the composite solid model placed in the layout representation, performing, by the computing system, at least one design rule check to compare the layout representation with electro-mechanical constraints.

2. The method of claim 1, wherein the composite part has physical dimensions described in the composite solid model that overlap with the physical dimensions of the selected parts described by the component models.

3. The method of claim 1, further comprising receiving, by the computing system, user input corresponding to the multiple parts, wherein selecting the multiple parts is based on the user input.

4. The method of claim 1 further comprises identifying, by the computing system, the component models for each of the multiple parts from the library storing the component models.

5. The method of claim 1, wherein placing the composite solid model in the layout representation of the circuit design further comprises augmenting a data model associated with the layout representation of the circuit design to include the composite solid model.

6. The method of claim 1, wherein the composite solid model in the layout representation of the circuit design corresponds to a three-dimensional representation of a physical combination of the component models corresponding to the multiple parts.

7. A system comprising:
    a memory device configured to store machine-readable instructions; and
    a computing system including one or more processing devices, in response to executing the machine-readable instructions, configured to
        select multiple parts having corresponding component models stored in a library accessible by the computing system, wherein each component model, when placed in a layout representation of a circuit design describing an electronic device, represents a single one of the parts;
        generate a composite solid model that represents a composite part, wherein the composite solid model describes physical dimensions of the composite part that correspond to an overlapping combination of physical dimensions of the selected parts described in the component models, and wherein the composite solid model, when placed in the layout representation of the circuit design, represents the composite part; and
        place the composite solid model in the layout representation of the circuit design, wherein the electronic device, when manufactured according to the layout representation of the circuit design, includes one of the selected parts corresponding to the composite solid model placed in the layout representation, perform at least one design rule check to compare the layout representation with electro-mechanical constraints.

8. The system of claim 7, wherein the composite part has physical dimensions described in the composite solid model that overlap with the physical dimensions of the selected parts described by the component models.

9. The system of claim 7, wherein the one or more processing devices, in response to executing the machine-readable instructions, are configured to identify user input corresponding to the multiple parts and select the multiple parts based on the user input.

10. The system of claim 7, wherein the one or more processing devices, in response to executing the machine-readable instructions, are configured to identify the component models for each of the multiple parts from the library storing the component models.

11. The system of claim 7, wherein the one or more processing devices, in response to executing the machine-readable instructions, are configured to place the composite solid model in the layout representation of the circuit design by augmenting a data model associated with the layout representation of the circuit design to include the composite solid model.

12. The system of claim 7, wherein the composite solid model in the layout representation of the circuit design corresponds to a three-dimensional representation of a physical combination of the multiple parts.

13. An apparatus comprising at least one computer-readable memory device storing instructions configured to cause one or more processing devices to perform operations comprising:
    selecting multiple parts having corresponding component models stored in a library accessible by the computing system, wherein each component model, when placed in a layout representation of a circuit design describing an electronic device, represents a single one of the parts;

generating a composite solid model that represents a composite part, wherein the composite solid model describes physical dimensions of the composite part that correspond to an overlapping combination of physical dimensions of the selected parts described in the component models, and wherein the composite solid model, when placed in the layout representation of the circuit design, represents the composite part; and placing the composite solid model in the layout representation of the circuit design, wherein the electronic device, when manufactured according to the layout representation of the circuit design, includes one of the selected parts corresponding to the composite solid model placed in the layout representation, performing at least one design rule check to compare the layout representation with electro-mechanical constraints.

14. The apparatus of claim 13, wherein the composite part has physical dimensions described in the composite solid model that overlap with the physical dimensions of the selected parts described by the component models.

15. The apparatus of claim 13, wherein the instructions configured to cause the one or more processing devices to perform operations further comprising identifying user input corresponding to the multiple parts and selecting the multiple parts based on the user input.

16. The apparatus of claim 13, wherein the instructions configured to cause the one or more processing devices to perform operations further comprising identifying the component models for each of the multiple parts from the library storing the component models.

17. The apparatus of claim 13, wherein the instructions configured to cause the one or more processing devices to perform operations further comprising augmenting a data model associated with the layout representation of the circuit design to include the composite solid model.

18. The apparatus of claim 13, wherein the composite solid model in the layout representation of the circuit design corresponds to a three-dimensional representation of a physical combination of the multiple parts.

\* \* \* \* \*